US008272399B2

(12) United States Patent
Farrow et al.

(10) Patent No.: US 8,272,399 B2
(45) Date of Patent: Sep. 25, 2012

(54) FLUID ADMISSION SYSTEM FOR PROVIDING A PRESSURE-BALANCED VALVE

(75) Inventors: Timothy J. Farrow, Fort Collins, CO (US); Gregory J. Brodsack, Loveland, CO (US); Ronald L. Witt, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 619 days.

(21) Appl. No.: 12/482,871

(22) Filed: Jun. 11, 2009

(65) Prior Publication Data

US 2009/0309053 A1  Dec. 17, 2009

Related U.S. Application Data

(60) Provisional application No. 61/061,327, filed on Jun. 13, 2008.

(51) Int. Cl.
*F16K 31/00* (2006.01)
(52) U.S. Cl. .......... 137/601.02; 137/625.28; 251/129.07
(58) Field of Classification Search ............. 251/129.07, 251/129.17, 325; 137/601.02, 625.28, 625.3, 137/625.38
See application file for complete search history.

(56) References Cited

U.S. PATENT DOCUMENTS

| 4,210,311 | A | * | 7/1980 | Stone | 251/129.07 |
| 4,552,177 | A | * | 11/1985 | Lapeyre | 137/625.28 |
| 5,398,724 | A | | 3/1995 | Vars et al. | |
| 5,939,811 | A | | 8/1999 | Enomoto et al. | |
| 5,967,487 | A | * | 10/1999 | Cook et al. | 251/64 |

(Continued)

FOREIGN PATENT DOCUMENTS

EP   0 717 186 A2   6/1996

OTHER PUBLICATIONS

Megasol Gas Injection Valves for Gas & Dual Fuel Engines, Metering of gas by solenoid, Engine & Turbine Controls, Heinzmann, product pamphlet, 2002, 4 pages, Heinzmann GmbH & Co.KG, Germany.

(Continued)

*Primary Examiner* — Eric Keasel
*Assistant Examiner* — Jessica Cahill
(74) *Attorney, Agent, or Firm* — Reinhart Boerner Van Deuren P.C.

(57) ABSTRACT

A valve assembly includes a valve housing located between a fluid inlet region maintained at a first pressure and a fluid outlet region maintained at a second pressure. A movable metering plate is located within valve housing. A fixed metering plate interacts with the movable metering plate to meter fluid flow through the valve housing. An armature is coupled to the movable metering plate and is configured to move the movable metering plate from a closed position toward an open position. The fluid admission system further includes a balancing region to balance pressure related forces acting on the movable portions of the valve, including the metering plate. A balance passageway is in communication with the balancing region and the fluid outlet region to maintain the balancing region at the second pressure of the fluid outlet region when the movable metering plate is in the closed position.

15 Claims, 8 Drawing Sheets

U.S. PATENT DOCUMENTS

| | | | | |
|---|---|---|---|---|
| 6,000,677 | A | * | 12/1999 | Cook et al. ............... 251/129.07 |
| 6,112,765 | A | | 9/2000 | Boyer |
| 6,321,767 | B1 | * | 11/2001 | Seid et al. ................. 137/15.21 |
| 6,832,619 | B1 | | 12/2004 | Walsh |
| 7,000,895 | B2 | | 2/2006 | Gessaman |
| 7,152,628 | B2 | * | 12/2006 | Folk et al. ................ 137/625.33 |
| 2002/0079472 | A1 | * | 6/2002 | Kumar ..................... 251/129.07 |

OTHER PUBLICATIONS

Woodward Installation and Operation Manual, SOGAV™ Solenoid Operated Gas Admission Valve, SOGAV 36, Manual 26209 (Revision H), 2009, 36 pages, Woodward, Fort Collins, Colorado (Previous revision G published in 2006).

* cited by examiner

FLUID ADMISSION SYSTEM FOR PROVIDING A PRESSURE-BALANCED VALVE

CROSS-REFERENCE TO RELATED PATENT APPLICATIONS

This patent application claims the benefit of U.S. Provisional Patent Application No. 61/061,327, filed Jun. 13, 2008, the disclosure and teachings of which are incorporated herein, in their entireties, by reference.

TECHNICAL FIELD

This invention generally relates to a fluid admission system and, more particularly, to a fluid admission system for balancing pressure related forces across a valve.

BACKGROUND

In fluid flow designs for high pressure industrial applications, for example, high pressure fluid flow through a valve may create forces which tend to close the valve, particularly when the valve is in or near a fully closed position. This flow force increases the actuation force required to stroke or open the valve. Fuel admission systems for use with large internal combustion engines in industrial or mobile applications may involve significantly high pressures and flow rates. Generally, mechanically and/or hydraulically actuated valves have been used to achieve the actuation forces sufficient to overcome the high pressures at the valve, which tend to urge the valve toward the closed position. Due to force limitations, electrically actuated valves generally produce lower actuation forces than that achieved with mechanical and/or hydraulic actuators. As a result, electrically actuated valves have typically not been used with large engines in industrial or mobile applications requiring high actuation forces.

Electrically actuated valves have been known to provide fast, reliable actuation, which is advantageous in internal combustion engines used in industrial or mobile applications. In such applications, the ability to control the admission of fuel to each cylinder of a multiple cylinder engine precisely and independently may result in balanced firing of all of the engine cylinders. As a result, engine vibrations and engine wear may be reduced, and efficient engine operation may be achieved. In addition, balanced firing may result in improved fuel economy and reduced emissions. Therefore, improved engine operation may be achieved in engine applications by using an electrically actuated valve to control fuel admission in which the actuation force for stroking or opening the valve is reduced.

In addition to the force limitation issues associated with electrically actuated valves, a problem in the operation of these valves can result when an engine operator or engine system rapidly rejects load. This may occur when the operator or system rapidly throttles down the engine from a high load condition to an essentially no-load condition at which no power is required or being drawn from the engine or system powered by the engine. In such situations, the engine intake manifold pressure falls quickly, in as little as a fraction of a second.

The rapid load reduction promotes the rapid closure of the engine throttle to maintain engine speed. Such rapid throttle closure results in a dramatic drop in intake manifold pressure, reducing the pressure on the downstream side of the valves below their normal operating pressure. However, as the upstream side of the valves are still exposed to high pressure fluid (fuel), the pressure differential across the movable metering plates and movable portions of the valves increases. As noted above, the pressure across these valves is already high, and the valves are already configured to operate proximate a threshold differential pressure which must be overcome by the actuation systems of the valves. Unfortunately, this spike in pressure differential due to the drop in intake manifold pressure at the (fuel admission valve outlet) can lock the valves in their closed position and prevent them from being opened via their actuation systems. Such locking of the fuel admission valves will then stall engine operation until normal valve function is restored. Further amplifying this problem is the lack of a simple way to release the pressure on the high pressure side of the valve to unlock the valve.

While there have been attempts to add supplemental pressure relief arrangements to address this valve lock-up problem, this adds complexity and expense to the fuel admission system. Further, many of these fuel admission systems are restricted in size. In such applications, the pressure relief arrangements designed to address this problem cannot be installed due to insufficient space.

The present invention relates to improvements over the current state of the art for fuel admission valves.

BRIEF SUMMARY

The present invention has numerous features that can be used together or in combination. The present invention relates to new and improved fluid admission systems that provide for use of electronic actuators to drive a valve. More particularly, the present invention relates to new and improved fluid admission systems that include balanced or partially balanced valves. One benefit of embodiments of the present invention is that the pressure related forces acting on opposite sides of the movable portions of the valve are substantially more equal, reducing the forces needed to drive the movable portions of the valve to an open condition. A further benefit of one or more embodiments of the present invention is that the balancing of the valve substantially eliminates valve lock-up due to rapid throttling down of the engine in prior art fluid admission systems.

In one particular embodiment of the invention, a fluid admission system including a valve housing, fixed and movable metering plates, an armature, a balancing arrangement and a balancing chamber. The valve housing has a fluid inlet region and a fluid outlet region. The movable metering plate is movable relative to the fixed metering plate along a linear travel axis. In a closed position, a seal surface of the movable metering plate abuts an abutment surface of the fixed metering plate to prevent fluid flow from the fluid inlet region to the fluid outlet region. In an open position, the first metering plate and the fixed metering plate are separated by a distance to allow fluid flow from the fluid inlet region to the fluid outlet region. The armature is coupled to the movable metering plate configured to move the movable metering plate relative to the fixed metering plate. The balancing arrangement is operably coupled to the movable metering plate for applying biasing to the first metering plate so as to provide balancing of the valve. The balancing chamber, in a preferred embodiment, is completely fluidly separated from the fluid inlet region by the balancing arrangement when the movable metering plate is in the closed position. The balancing arrangement has a first balancing area acted on by a first fluid pressure within the inlet region to operably bias the movable metering plate toward the open position. The balancing arrangement has a second balancing area acted on by a second fluid pressure that is within the balancing chamber to operably bias the movable metering plate toward the closed position. The second fluid pressure is independent of the first fluid pressure in the closed position.

In a more particular embodiment, the fixed metering plate defines a flow opening through the abutment surface thereof through which fluid flow passes in the open position, the seal surface that abuts the abutment surface of the fixed metering plate and over laps and seals off the flow opening in the closed position.

Further, the movable metering plate has a first effective surface area that is normal to the travel axis and that is acted on by the first fluid pressure to bias the movable metering plate toward the closed position. The movable metering plate has a second effective surface area that is normal to the travel axis and is exposed to the second fluid pressure to bias the movable metering plate toward the open position. The second effective surface area is formed by the portion of the seal surface that overlaps the flow opening of the fixed metering plate and is not abutted against the abutment surface. The first balancing area is an effective area being normal to the travel axis. The second balancing area is an effective area being normal to the travel axis. It should be noted that the actual surface areas that form the effective surface areas may not be normal to the travel axis themselves, but is the surface area equivalent as if the surface was normal.

In a preferred embodiment, the first balancing area and the first effective area are equal and the second balancing area and the second effective area are equal. This will render the fluid admission system, and particularly the movable metering plate, balanced such that pressure differentials will not significantly effect the actuation force required to transition to the open position.

The balancing arrangement, in one embodiment, is formed, in part, by a balance seal coupled between the valve housing and the armature. The balance arrangement is also formed, in part, by the armature such that at least a portion of the armature forms part of the first balancing area, the armature also forming a portion of the second balancing area, the second balancing area being sealed from the fluid inlet region by the balance seal.

The balance seal preferably comprises an annular diaphragm through which the armature extends. The diaphragm, being flexible, allows the armature to move along the travel axis. The balance seal may be coupled to the armature by a bead retainer. The bead retainer may form part of the first balancing area upon which the first pressure acts to bias the movable metering plate toward the open position. Further, a biasing element biasing the movable metering plate toward the closed position may be provided. The biasing element is more and more useful for closing the movable metering plate as the metering plate becomes increasingly balanced. In one embodiment, the movable metering plate is balanced such that the only effective force maintaining the movable metering plate in the closed position is the force provided by the spring element.

In a preferred implementation, the movable metering plate includes a first plurality of grooves located in the seal surface. A second plurality of grooves are located in the abutment surface of the fixed metering plate with which the sealing surface abuts. The second plurality of grooves combine to form the flow opening. Adjacent ones of the first plurality of grooves of the movable metering plate are separated by a first land portion that overlaps the second plurality of grooves of the fixed metering plate when the seal surface of the movable metering plate abuts the abutment surface of the fixed metering plate in the closed position. The first land portions define the seal surface. Adjacent ones of the second plurality of grooves of the fixed metering plate are separated by a second land portion that overlaps the first plurality of grooves of the movable metering plate when the seal surface of the movable metering plate abuts the abutment surface of the fixed metering plate in the closed position.

While preferred embodiments may be exploited by providing only the admission valve, other embodiments may be exploited as a full system. As such, they may include an actuator that causes the armature to move the movable metering plate from the closed position to the open position when energized. The armature may preferably comprise a ferrous metal armature. The actuator includes a solenoid configured to generate a magnetic field when energized to attract the ferrous metal armature to move the movable metering plate from the closed position to the open position. The system may further include a driver operably coupled to the actuator. The driver is configured to energize the solenoid to move the movable metering plate from the closed position to the open position. Further, a combustion cylinder of an engine may be provided. The combustion cylinder is in fluid communication with the fluid outlet region. The driver regulates fluid flow from the fluid inlet region to the fluid outlet region for admission to the combustion cylinder.

The inlet region is configured to be fluidly coupled to a source of a first fluid at the first fluid pressure. The fluid outlet region is fluidly coupled to a source of a second fluid at the second fluid pressure that is less than the first pressure.

In one embodiment, the balancing chamber fluidly communicates with the outlet region when the movable metering plate is in the closed position. In a preferred embodiment, a balancing passage passes through the armature. The balancing passage fluidly communicates the outlet region with the balancing chamber when the movable metering plate is in the closed position.

In highly preferred embodiments, the fluid inlet region is fluidly coupled to a source of a first fluid at a first fluid pressure (P1) and the fluid outlet region is fluidly coupled to a source of a second fluid at a second fluid pressure (P2) that is less than the first fluid pressure. The first effective surface area (A1'), the second effective surface area (A1"), the first balancing area (A2'), and the second balancing area (A2") are configured to satisfy the following equation: $P1*(A1')+P2*(A2")=P1*(A2')+P2*(A1")$ such that the fluid pressure generated forces on the movable metering plate are balanced. However, in alternative embodiments, the following equation may be satisfied: $P1*(A1')+P2*(A2")=X*(P1*(A2')+P2*(A1"))$, wherein X is between about 0.8 and 1.2 More preferably, X is between about 0.9 and 1.1. The closer that X becomes to 1 the closer the movable metering plate is to becoming balanced. When X is less than 1, the system is considered to be "underbalanced" and the pressure forces on the movable valve components act to drive the valve to a closed condition. When X is greater than 1, the system is considered to be "overbalanced" and the pressure forces on the movable valve components act to drive the valve to an open condition.

In a preferred embodiment where the armature is made of a ferrous metal and is not itself magnetic, it is preferred to have X below 1 so that the valve is underbalanced and biased towards a closed position by the pressure related forces acting on the valve, such that the valve is configured as a normally closed valve. However, in other embodiments, such as where the armature is magnetic and the valve can be driven either open or closed, e.g. by reversing polarity of a coil of the actuation system, X can be above or below 1. Further, it should be noted that the ranges identified above are preferred ranges. However, X could take on values in a much broader range in different arrangements. For example only, X could be anything greater than zero (0) and less than two and a half (2.5), but the invention is not so limited, unless otherwise specified.

During the design of a valve that is to have, for example, an X value of at most one (1), its corresponding tolerance stack up would be configured so that the maximum X value of one (1) would be attained only in the worst case scenario. This would prevent any member of the population of produced valves from exceeding the upper limit of an X value of one (1); hence, any valve so produced would be underbalanced.

Finally, to avoid the movable metering plate from significantly changing from its designed balanced or partially balanced state after the movable metering plate moves to the open position, it is preferable to have the amount of surface area of the seal surface that does not form the effective surface area in the closed position be minimal. This surface area is the surface area that actually abuts the abutment surface in the closed position such that no fluid pressure is acting on that portion of the seal surface in the closed state. Otherwise, when the movable metering plate moves towards the open position, this previously unacted upon surface is now being biased by the fluid flowing through the flow opening in the abutment surface. However, in most implementations, this force is generally minimal.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
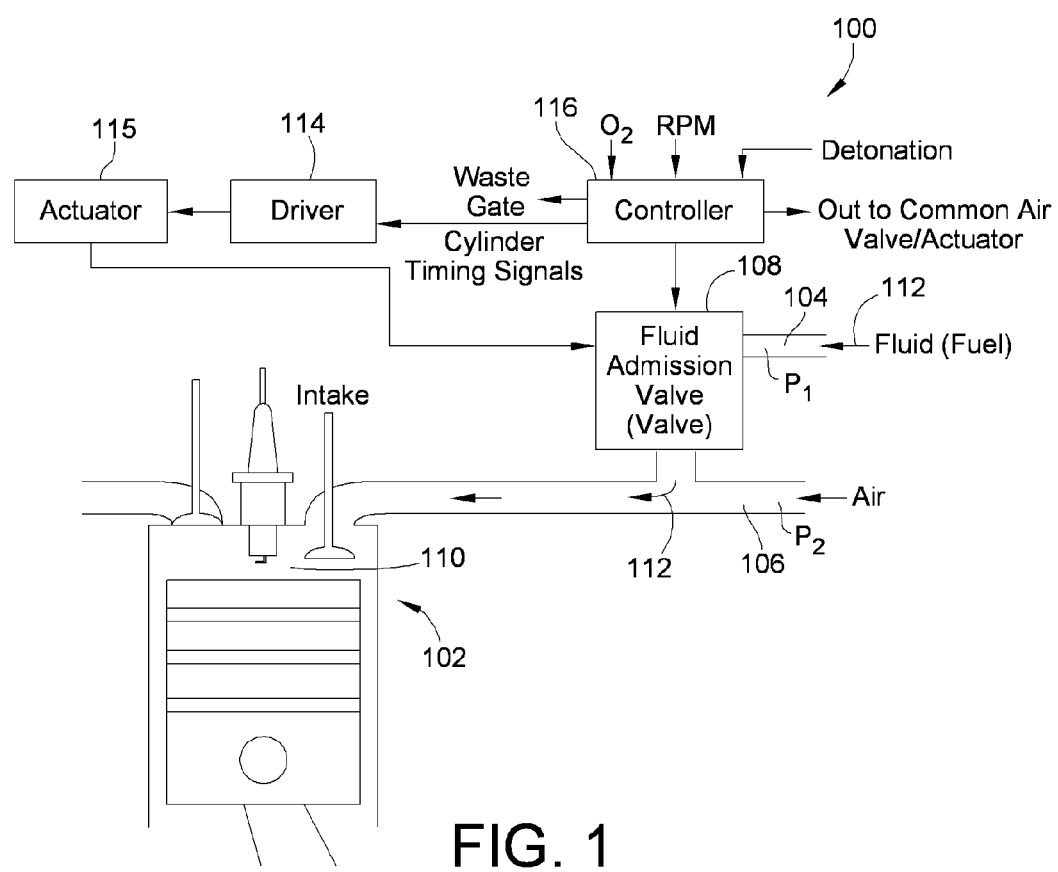
FIG. 1 is a schematic block diagram of a fluid admission system according to one embodiment, including a fluid admission valve (valve) for controlling fluid flow to an internal combustion engine.

Referring to FIG. 1, an embodiment of a fluid admission system 100 for use with an internal combustion engine 102 is shown. The engine 102 may be a multiple cylinder, large bore engine capable of generating extremely high power for use in industrial applications. Although the fluid admission system 100 is shown associated with an internal combustion engine 102 in FIG. 1, it is to be understood that the fluid admission system 100 is not specific to a particular type of engine configuration or application. For example, the fluid admission system 100 may be used with a reciprocating air and gas compressor, a continuous combustion engine (e.g., a turbine engine), a compression ignition engine, and the like.

As illustrated, the fluid admission system 100 includes a fluid supply manifold 104, an air intake manifold 106, a fluid admission valve 108 located between the fluid supply manifold 104 and the air intake manifold 106, and a combustion cylinder 110. When the fluid admission valve 108 is in the open position, fluid at a pressurized first pressure (P1) flows from the fluid supply manifold 104 through the fluid admission valve 108 to the air intake manifold 106 where the fluid mixes with a flowing stream of air before it is admitted to the combustion cylinder 110.

The air intake manifold 106 is maintained at a second pressure (P2) that is typically less than the pressurized first pressure (P1). As a result, pressurized fluid will flow from the area of the higher first pressure (P1) in the fluid supply manifold 104 through the fluid admission valve 108 to the area of the lower second pressure (P2) in the air intake manifold 106 when the fluid admission valve 108 is in an open position. In FIG. 1, the direction of fluid flow is shown generally by arrows 112. In one embodiment, the second pressure (P2) at the air intake manifold 106 is approximately at atmospheric pressure. By increasing the differential pressure (i.e., P1-P2 or ΔP) across the fluid admission valve 108, fluid flow rate from the fluid supply manifold 104 to the air intake manifold 106 may be increased.

In one embodiment, the fluid admission valve 108 is an electromagnetically actuated, face-type poppet valve configured to move linearly between a fully closed position and a fully open position, and intermediate positions therebetween. Fluid flow from the fluid supply manifold 104 to the air intake manifold 106 is blocked when the fluid admission valve 108 is in the closed position. On the other hand, fluid is allowed to flow from the fluid supply manifold 104 to the air intake manifold 106 as a function of the open valve flow area when the fluid admission valve 108 is in the open position. Although the fluid admission valve 108 in a preferred embodiment includes a poppet valve, it is to be understood that the fluid admission valve 108 may include other linearly translatable valves such as, for example, a reciprocating valve, a spool valve, and the like.

The fluid admission system 100 also includes a driver 114, an actuator 115, and an engine controller 116. As will be described in greater detail below, the driver 114 includes electronic circuitry to electronically activate the actuator 115 to open the fluid admission valve 108, and to de-activate the actuator 115 to close the fluid admission valve 108. Although the fluid admission valve 108 is described as being electronically controlled by an electronic driver 114, it is to be understood that the fluid admission valve 108 may be mechanically, hydraulically, or pneumatically controlled if desired.

The engine controller 116 such as, for example, an electronic fuel injection controller (EFIC) controls engine speed by monitoring various operating parameters of the engine 102, and controlling the driver 114 to move the fluid admission valve 108 from the closed position to the open position, and vice versa. In one embodiment, the engine 102 is a multi-cylinder engine having a fluid admission valve 108 associated with each of the individual cylinders 110. The fluid admission valve 108 is operably controlled by the engine controller 116 and driver 114 to regulate fluid flow to each of the individual cylinders 110. Specifically, the engine controller 116 may receive measurements of an engine operating parameter such as, for example, the speed and/or angular position of a shaft associated with the engine 102. The engine controller 116 may then send control signals to the driver 114 dictating the sequence in which the various valves 108 will open and close based on the sensed engine parameters. The engine controller 116 may also be configured to control the duration of time that an individual valve 108 is in the open position, i.e., "dwell time." As a result, the engine controller 116 is capable of controlling the operation of the fluid admission valve 108 in a consistent, repeatable manner to ensure consistent admission of fluid to the engine combustion cylinder 110 and, thus, balanced firing throughout each cycle of engine operation.

In one embodiment, the engine controller 116 includes a microprocessor-based controller configured to provide computerized control of engine operation. It is to be understood, however, that the engine controller 116 may include a plurality of integrated, discrete electrical components, such as, for example, an application specific integrated circuit (ASIC), and the like.

Figure 2:
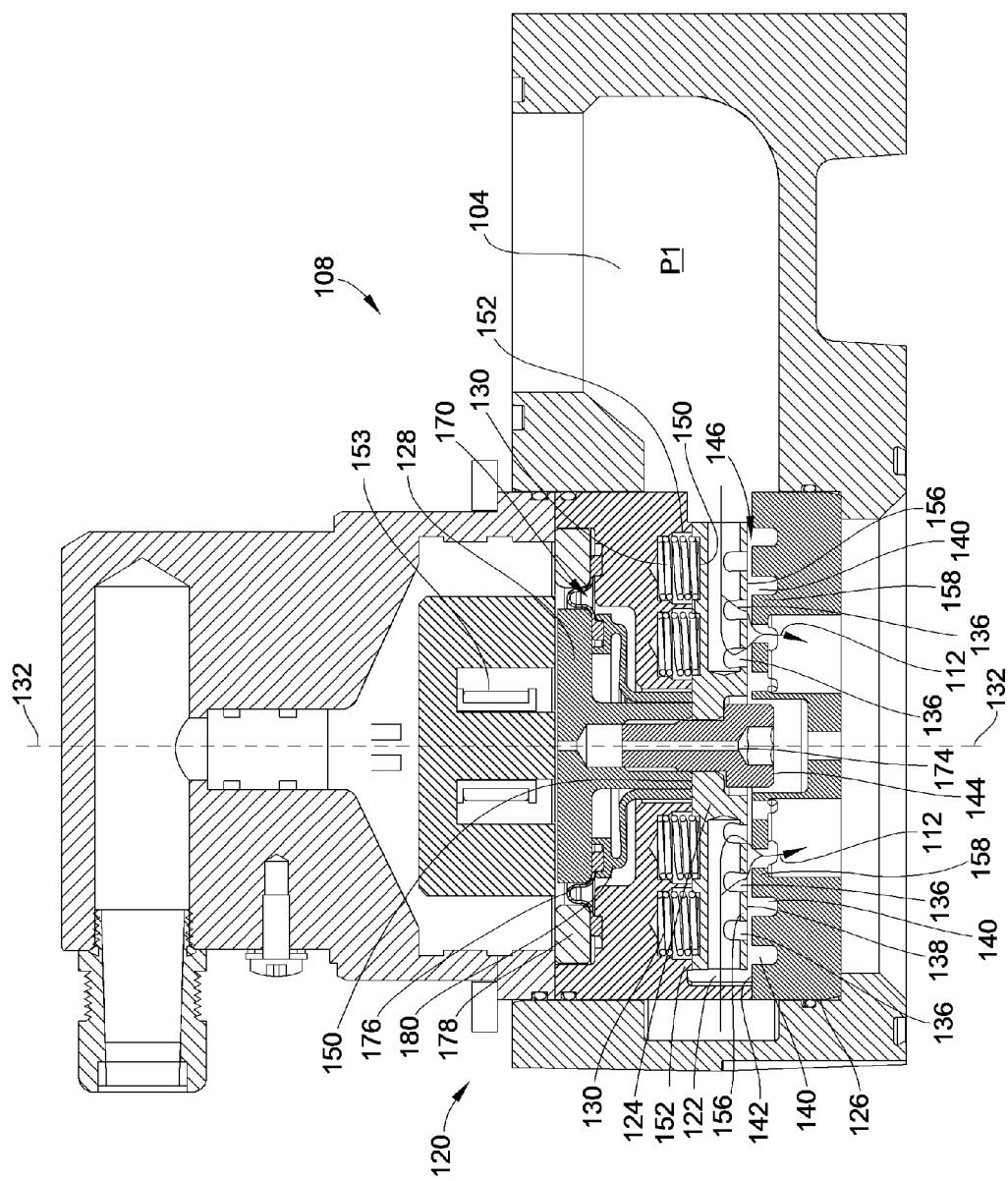
FIG. 2 is a cross-sectional view of a fluid admission valve in an open position.

Referring to FIG. 2, the fluid admission valve 108 is shown in an open position. The fluid admission valve 108 generally includes a valve housing 120 defining an inlet chamber 122 therein, a movable metering plate 124, a fixed metering plate 126, an armature 128, and a biasing element illustrated in the form of a plurality of spring elements 130.

The inlet chamber 122 is in fluid communication with the fluid supply manifold 104, which is maintained at the fluid pressure (P1) of the high pressure fluid supply. As a result, the inlet chamber 122 is likewise maintained at the fluid supply pressure (P1) of the fluid supply manifold 104. As will be described in greater detail below, the movable metering plate 124, the armature 128, and the spring element 130 are all coupled together such that the spring element 130 contracts and expands as the movable metering plate 124 and the armature 128 move linearly in the inlet chamber 122 along a linear travel axis 132.

A first plurality of grooves 136 is located in the bottom surface 138 (also referred to as a "seal surface") of the movable metering plate 124. A second plurality of grooves 140 is located in the upper surface 142 (also referred to an "abutment surface") of the fixed metering plate 126. In the illustrated embodiment, each of the first plurality of grooves 136 and the second plurality of grooves 140 is provided by a plurality of concentric, circular channels formed on the bottom surface 138 of the movable metering plate 124 and the upper surface 142 of the fixed metering plate 126, respectively.

As shown in FIG. 2, the movable metering plate 124 and the fixed metering plate 126 are separated forming gap 146 when the fluid admission valve 108 is in the open position, thereby providing an open flow passage through the valve housing 120 such that fluid from the fluid supply manifold 104 flows through the first and second pluralities of grooves 136, 140 (fluid flow indicated generally by arrows 112) to the air intake manifold 106.

The armature 128 is located within the valve house 120 and at least partially in inlet chamber 122 and has a generally cylindrical configuration. It is to be understood, however, that the armature 128 may have any desired shape or configuration. The armature 128 is operably coupled to the movable metering plate 124 by a fastener 144 such as, for example, a bolt, a screw, or the like. Upon activation by the driver 114, the actuator 115 causes the armature 128 to move linearly along the axis 132 within valve housing 120, thereby causing the movable metering plate 124 coupled thereto to move in a similar linear manner. As a result of the linear translation of the movable metering plate 124 along the axis 132, the spring elements 130 acting on the upper surface 150 of the movable metering plate 124 contracts until the upper surface 150 of the movable metering plate 124 contacts a stop plate 152 or abutment or stop arrangement formed in the valve housing 120. The stop plate 152 functions to limit axial movement of the movable metering plate 124 in a particular direction, e.g., a vertical direction. In one embodiment, the gap 146 between the bottom surface 138 of the movable metering plate 124 and the upper surface 142 of the fixed metering plate 126 is, for example, approximately 0.5 mm when the fluid admission valve is in the fully open position. Therefore, the fluid admission valve 108 may be opened and closed in a rapid, fast-acting manner (e.g., 1.2 msec) due to the short transition distance between the fully closed position and the fully open position.

Figure 3:
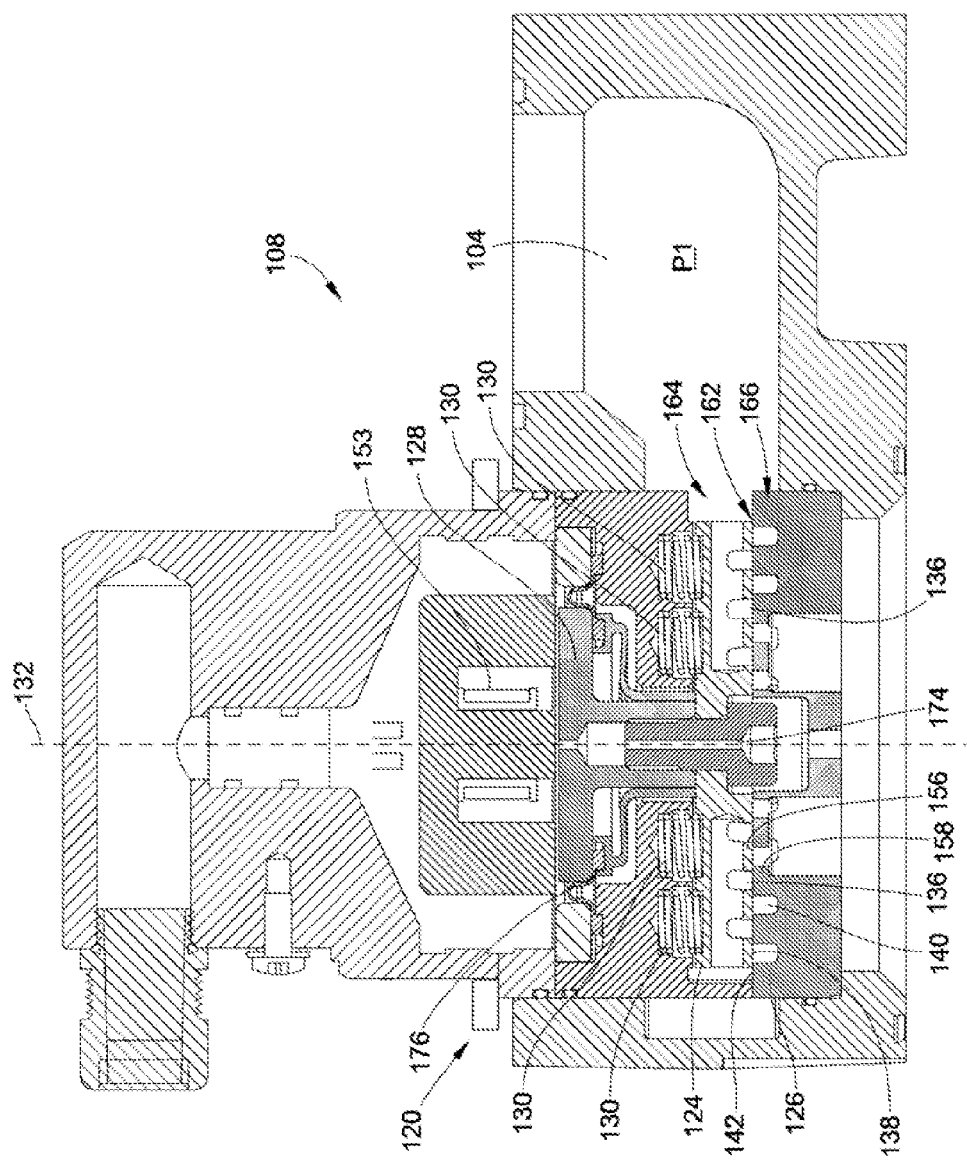
FIG. 3 is a cross-sectional view of the fluid admission valve of FIG. 2 in a closed position.
Figure 4:
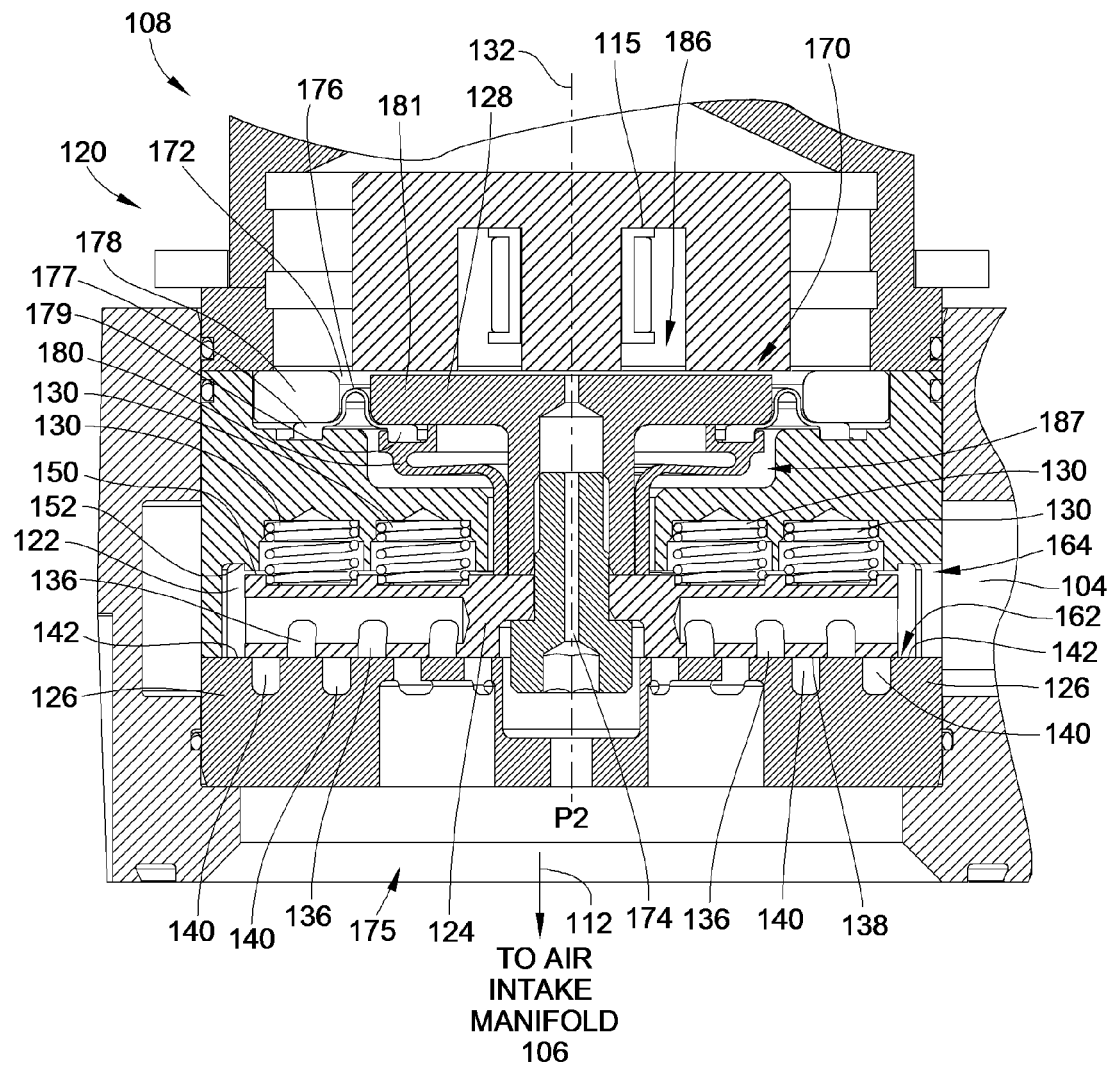
FIG. 4 is a cross-sectional view of one embodiment of a pressure-balanced valve, including a balancing arrangement, in a closed position.

The driver 114 activates the actuator 115, such as, for example, illustrated in FIGS. 2-4 as solenoid 153 by applying energization current to a coil of the solenoid 153. When the coil is energized, a magnetic field is generated that attracts the armature 128 to move the fluid admission valve 108 from the closed position toward the open position. In one embodiment, the armature 128 is a ferrous metal armature that is capable of being attracted to the magnetic field generated by the solenoid 153 upon the application of energization current to the solenoid coil by the driver 114. Conversely, the driver 114 de-activates the actuator 115 by removing energization current to the coil such that the fluid admission valve 108 moves from the open position toward the normally closed position. The construction and operation of the solenoid 153 are conventional and, therefore, are not discussed further herein.

The spring elements 130 act on the upper surface 150 of the movable metering plate 124. In one embodiment, the spring elements 130 include an array of individual springs or biasing elements acting on the upper surface 150 of the movable metering plate 124. The spring elements 130 are configured to urge or bias the movable metering plate 124 into abutment with the fixed metering plate 126 when the fluid admission valve 108 is in the normally closed position.

As shown in FIG. 2, the bottom surface 138 of the movable metering plate 124 includes a first plurality of lands 156 separating adjacent ones of the first plurality of grooves 136. Preferably, lands 156 are wider than the adjacent grooves 136. Similarly, the upper surface 142 of the fixed metering plate 126 includes a second plurality of lands 158 which separate adjacent ones of the second plurality of grooves 140. Preferably, lands 158 are wider than the adjacent grooves 140, however, this is not necessary.

Referring to FIG. 3, the fluid admission valve 108 is shown in the closed position. In the closed position, the bottom surface 138 of the movable metering plate 124 abuts the upper surface 142 of the fixed metering plate 126. In the closed position, various ones of the first plurality of lands 156 of the movable metering plate 124 align with and overlap a corresponding one of the second plurality of grooves 140 of the fixed metering plate 126. Similarly, various ones of the second plurality of lands 158 of the fixed metering plate 126 overlap and align with a corresponding one of the first plurality of grooves 136 of the movable metering plate 124 when the fluid admission valve 108 is in the closed position. As such, the lands 156 of the movable metering plate 124 are wider than the corresponding grooves 140 of the fixed metering plate 126. Similarly, lands 158 of the fixed metering plate 126 are wider than the corresponding grooves 136 of the movable metering plate 124.

When the bottom surface 138 of the movable metering plate 124 is in abutment with the upper surface 142 of the fixed movable plate 126 in the closed position, a valve seat 162 is created by the abutment of the metering plates 124, 126 to block fluid flow through the fluid admission valve 108 and provided in part by the movable metering plate 124 and in part by the fixed metering plate 126. An upper portion 164 of the valve seat 162 is subjected to a first pressure (P1) such as, for example, fluid pressure from the high pressure fluid supply manifold 104. The upper portion 164 of the valve seat 162 in the illustrated embodiment is provided by the surfaces of the movable plate 124 and corresponding structures such as, for example only, armature 128 and other associated structures that are acted on by (P1) in the closed position. These surfaces result in an effective (or net) surface area A1' (see schematic illustration of FIG. 5) that is orthogonal to axis 132 and faces away from fixed plate 126.

A lower portion 166 of the valve seat 162 is subjected to a second pressure (P2) that is different than the first pressure (P1) such as, for example, atmospheric pressure (P2) from the air intake manifold 106. The lower portion 166 of the valve seat 162 in the illustrated embodiment is provided by the surfaces of the movable plate 124 that are acted on by (P2) in the closed position. Typically, these surfaces are the bottoms of lands 156, and particularly the portions of lands 156 that are not in contact with or overlap with lands 158. These surfaces result in an effective surface area A1" (see FIG. 5) that is orthogonal to axis 132 and faces toward fixed plate 126.

Because the fluid pressure (P1) is greater than ambient atmospheric pressure (P2), a differential pressure is created across the valve seat 162, which tends to urge the fluid admission valve 108 toward the closed position, i.e. towards fixed metering plate 126. As a result, a large actuation force may be required to overcome both the pressure-loaded and spring-loaded forces acting on the upper portion 164 of the valve seat 162 to move the fluid admission valve 108 from the closed position toward the open position, i.e. away from the fixed metering plate 126. Typically, an electronically-activated actuator is not capable of generating an actuation force sufficient to overcome the spring and pressure forces at the upper portion 164 of the valve seat 162 when the fluid admission valve 108 is in the closed position. This is particularly true in current systems once differential pressure across the valve 108 is greater than or equal to 1.7 bar.

Referring to FIG. 4, the valve housing 120 includes a balancing arrangement 170 to counteract/counterbalance the spring and pressure forces applied to the upper portion 164 of the valve seat 162 when the fluid admission valve 108 is in the closed position. The balancing arrangement 170 is operably coupled for coordinated movement with the movable metering plate 124 and reduces the actuation force required to move the fluid admission valve 108 from the closed position toward the open position. The balancing arrangement 170 in combination with the valve housing 120 defines a balancing chamber 172 (also referred to herein as a low pressure chamber 172) that is at low pressure second pressure (P2). The balancing arrangement 170 separates the balancing chamber 172 from the inlet chamber 122. A balance passageway 174 is created between and fluidly communicates the low pressure chamber 172 and a fluid outlet region 175 of the admission valve 108 which is coupled to the air intake manifold 106 and is at second pressure (P2). The balance passageway 174 maintains the low pressure chamber 172 at the second pressure (P2) of the fluid outlet region 175 when the fluid admission valve 108 is in the closed position and open position. Typically, second pressure (P2) will remain substantially the same even after the valve is open and the first pressure (P1) will not be communicated through balance passageway 174. If there is any change in the pressure after opening the valve, this change is minimal. Such minimal change will be contemplated as no-change.

Forming part of the balancing arrangement 170 in the illustrated embodiment, a balance seal 176 seals the low pressure chamber 172 from the inlet chamber 122 such that an upper portion 186 of the balancing arrangement 170 is acted on by second pressure (P2) and a lower portion 187 of the balancing arrangement 170 is acted on by first pressure (P1). The effective surface A2' (see FIG. 5) of the lower portion 187 of the balancing arrangement 170 acted on by first pressure (P1) faces toward the valve seat 162 and is orthogonal to axis 132. The effective area A2" (see FIG. 5) of the upper portion 186 of the balancing arrangement 170 acted on by second pressure (P2) faces away from the valve seat 162 and is orthogonal to axis 132.

With reference to FIG. 4, the illustrated balance seal 176 is a balance diaphragm. The balance seal includes a radially outer bead 177 coupled between an outer bead retainer 178 and a portion of the valve housing 120. A radially inner bead 179 of the balance seal 176 is coupled between an inner bead retainer 180 and an upper portion 181 of the armature 128. Thus, axial seals are provided. Alternatively, a dynamic o-ring or a dynamic lip seal may be used as the balance seal 176. Further, radial seals could be provided.

In the illustrated embodiment, the upper portion 181 of the armature forms another part of the balancing arrangement 170.

As will be described in greater detail below, the fluid admission valve 108 is pressure-balanced, or at least partially pressure-balanced, because the valve 108, and particularly the movable portion thereof including the balance seal 176, movable plate 124 and armature 128, is subjected to equal or nearly equal pressure forces in opposed axial direction along axis 132.

Figure 5:
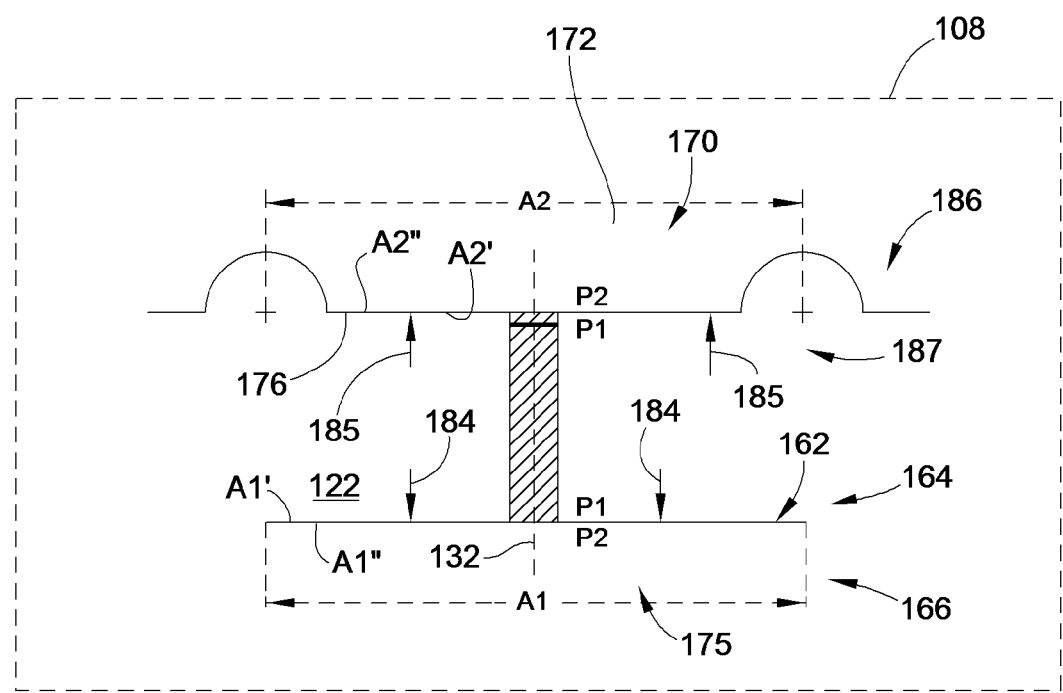
FIG. 5 is a schematic diagram showing the locations of various pressures at the valve seat and the balancing arrangement of the fluid admission valve of FIG. 4.

FIG. 5 shows a schematic representation of the locations of the first and second pressures (P1, P2) at both the valve seat 162 and the balancing arrangement 170 of the fluid admission valve 108. In the schematic representation, it is assumed that the effective areas (A1', A1" (collectively A1), A2' and A2" (collectively A2)) of the upper and lower portions 164, 166 of the valve seat 162 and upper and lower portions 186, 187 acted upon by the first and second pressures (P1, P2), respectively are equal. However, this may not be the case in other arrangements.

As shown in FIG. 5, the first pressure (P1) in the inlet chamber 122 acts against the effective area A1' of the upper portion 164 of the valve seat 162 urging the fluid admission valve 108 toward the closed position. Because the second pressure (P2) acting on the effective area A1" of the lower portion 166 of the valve seat 162, which is different than the first pressure (P1) and the effective areas A1' and A1" acted on by first pressure (P1) and (P2) are equal, a first pressure force (F1) in one direction is created. First pressure force (F1) is illustrated schematically by arrows 184. Because this arrangement tends to urge the fluid admission valve 108 toward the closed position, the actuation force required to open the fluid admission valve 108, beyond the force exerted by the spring elements 130 (not shown in FIG. 5), is increased.

To counteract and balance the first pressure force (F1), the present arrangement includes balance arrangement 170 which generates a second pressure force (F2) substantially equal in magnitude, but opposite in direction to pressure force (F1). Second pressure force (F2) is illustrated schematically by arrows 185.

More particularly, the first pressure (P1) in the inlet chamber 122 acts against the effective area A2' of the lower portion 187 of the balance arrangement 170 urging the fluid admission valve 108 toward the open position. Because the second pressure (P2) acting on the effective area A2" of the upper portion 186 of the balance arrangement 170, which is different than the first pressure (P1) and the effective areas A2' and A2" acted on by first pressure (P1) and (P2) are equal, second pressure force (F2) in a direction opposite (F1) is created. Further, because the surface areas are all the same, first pressure force (F1) and second pressure force (F2) are substantially the same in magnitude, thereby resulting in the fluid admission valve 108 being fully balanced. When fully balanced, there is a cancellation of the pressure related forces acting on the movable parts (i.e. a valve member) of the fluid admission valve 108 such that the fluid admission valve 108 is not biased by pressure forces in either axial direction.

It should be noted that not all of the aforementioned effective surface areas A1', A1", A2', A2" need be identical. There just needs to be an equal force balance. More particularly, the following equation should be satisfied to balance the valve:

$$P1*(A1')+P2*(A2")=P1*(A2')+P2*(A1").$$

Most easily, this is provided by having the effective surface areas A1' and A2' equal and A1" and A2" equal. In other words, the effective surfaces areas acted on by a same pressure are equal such that they cancel each other out.

However, in alternative embodiments, the valve may not be completely balanced. In one embodiment, the valve is between about eighty (80) percent balanced and one-hundred twenty (120) percent balanced such that the X in the following equation:

$$P1*(A1')+P2*(A2")=X*(P1*(A2')+P2*(A1")),$$

is between about 0.8 and 1.2.

In more preferred implementations, the previous equation is satisfied such that the valve is substantially balanced between about ninety (90) percent balanced and one-hundred ten (110) percent balanced such that X is between about 0.9 and 1.1. However, if the valve utilizes a ferrous metal armature that can only be driven toward the open state, when the valve 108 is not fully balanced, it is most desirous to have the previous equation work such that the movable metering plate 124 is slightly biased closed, i.e. the valve 108 is underbalanced. As such, X in the previous equation is preferably less than one (1). When it is undesirable to have an X value greater than one (1), the valve 108 will typically be designed such that tolerance stack-up in the worst case scenario will result in the fully balanced valve, i.e. an X value of one (1), to avoid generating valves that are overbalanced.

In view of the aforementioned, in one embodiment, the effective surface areas of the valve seat 162 and the balancing arrangement 170 (i.e. effective surface areas facing opposite directions) upon which the first pressure (P1) acts are to be closely matched such that the forces applied by the first pressure (P1) to the moveable portions of the valve member are balanced along axis 132. Similarly, the effective surface areas of the valve seat 162 and the balancing arrangement 170 (i.e. effective surface areas facing opposite directions) upon which the second pressure (P2) acts are to be closely matched such that the forces applied by the second pressure (P2) are balanced. However, the surface area A1' of the valve seat 162 upon which first pressure (P1) acts and the surface area A1" of the valve seat upon which the second pressure (P2) acts need not be the same.

However, effective surface area A2' of the balance arrangement 170 upon which the first pressure (P1) acts is preferably the same size as effective surface area A1' of the valve seat 162. This will result in the forces applied by first pressure (P1) cancelling each other. Similarly, effective surface area A2" of the balance arrangement 170 upon which the second pressure (P2) acts should be the same size as effective surface area A1" of the valve seat 162. This will result in the forces applied by second pressure (P2) cancelling each other.

It is preferred, however, for A1 and A2 to be the same such that once the valve opens, the force balance remains, or substantially remains, the same as when the valve was closed so as to avoid any changes in the force balance once the valve opens.

When the surface areas (A2', A2") of the balancing arrangement 170 are different than the corresponding surface areas (A1', A1") of the valve seat 162 such that the above identified equation is not satisfied, the fluid admission valve 108 is partially balanced because the first pressure force (F1) at the upper portion 164 of the valve seat 162 and the second pressure force (F2) at the bottom portion of balance seal 176 are different. In any event, when the fluid admission valve 108 is in either a fully balanced or a partially-balanced state, the second pressure force (F2) at the balancing arrangement 170 counteracts the first pressure force (F1) at the valve seat 162 to reduce the actuation force required by the actuator 115 to move the fluid admission valve 108 from the closed position toward the open position.

Figure 6:
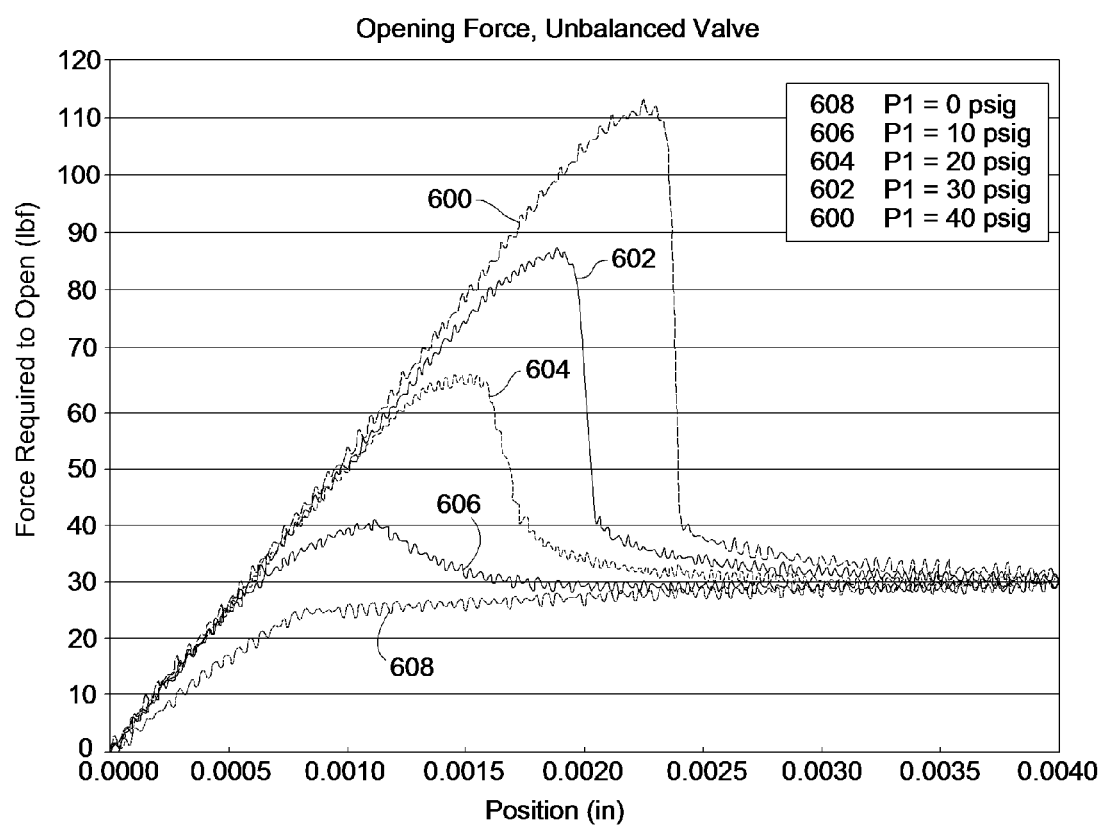
FIG. 6 is a graph illustrating plots of experimentally determined forces required to open an unbalanced valve subjected to various differential pressures.

FIG. 6 shows plots 600-608 of the actuating force sufficient to open an unbalanced fluid admission valve subjected to various differential pressures across the valve. While the graph plots forces vs. inches, these measured inches of travel are merely illustrative of inches of stretch in the testing material. These measurements of distance are not measures of valve travel. This figure illustrates that higher actuation forces are required to open the valve as the fluid pressure increases when the valve is unbalanced.

These tests were performed when P2 was at atmospheric pressure. Further, the force drops off significantly after the peak force is reached because the pressure source for P1 was incapable of maintaining the pressure of P1 once the valve opened. Thus, the force drops off to approximately thirty pounds of force as this was the spring force of spring elements 130. Thus, the peaks of these various plots illustrate the opening force required to open the valve and that this force increases as differential pressure increases for an unbalanced valve.

Figure 7:
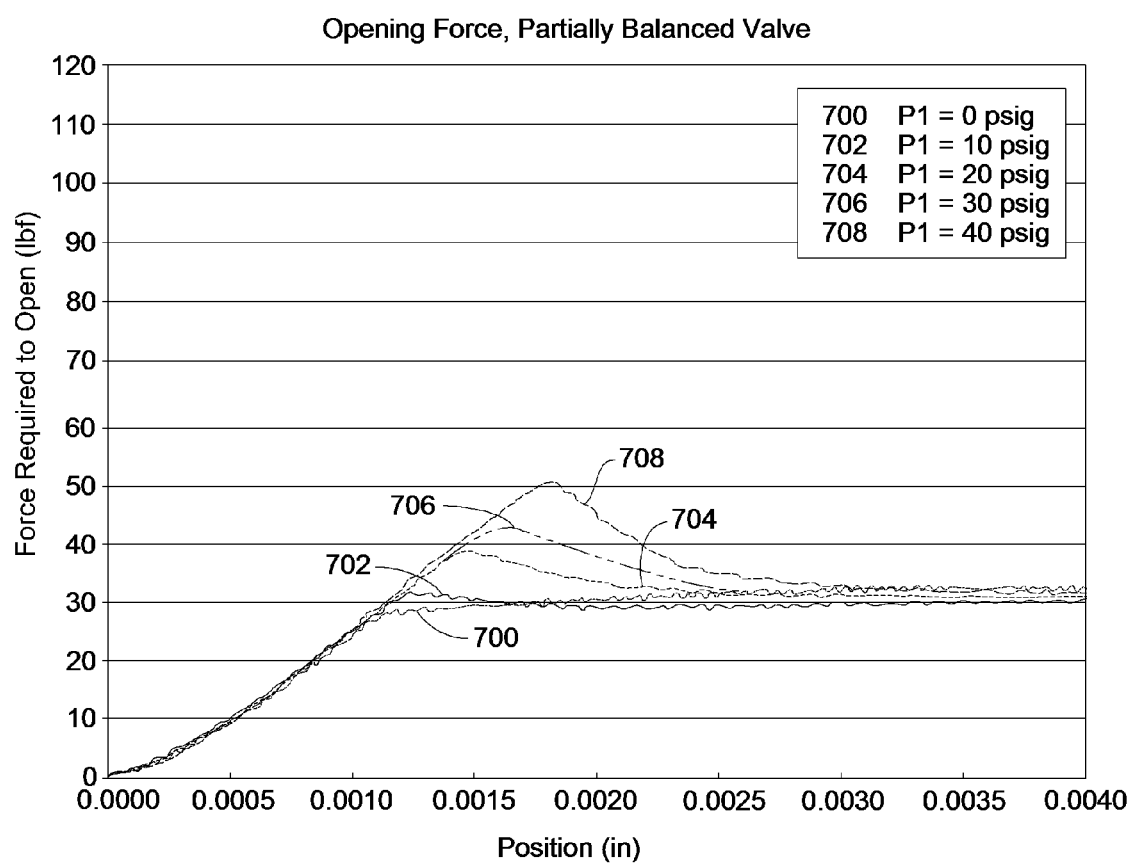
FIG. 7 is a graph illustrating plots of experimentally determined forces required to open a partially-balanced valve, similar to the valve used in FIG. 6, subjected to various differential pressures.

FIG. 7 shows plots 700-708 of the actuation force sufficient to open the fluid admission valve 108 of the present embodiment in a partially-balanced state and subjected to various fluid pressures. As compared to the plots 600-608 of the actuating force to open the unbalanced valve (see FIG. 6), FIG. 7 shows that the actuation force required to open the fluid admission valve 108 is reduced when the valve 108 is partially balanced.

Again, the plots of FIG. 7 are performed with P2 being atmospheric pressure. Further, the pressure source for P1 was again incapable of maintaining the pressure P1 once the valve opened. Thus, the force drops off to approximately thirty pounds of force once the valve is opened. In this experiment, the X value was below 1 as the valve was underbalanced. Further, the distance variable in the plots is attributed again to flexure in the test system and is not actual measurements of the amount of valve opening.

Figure 8:
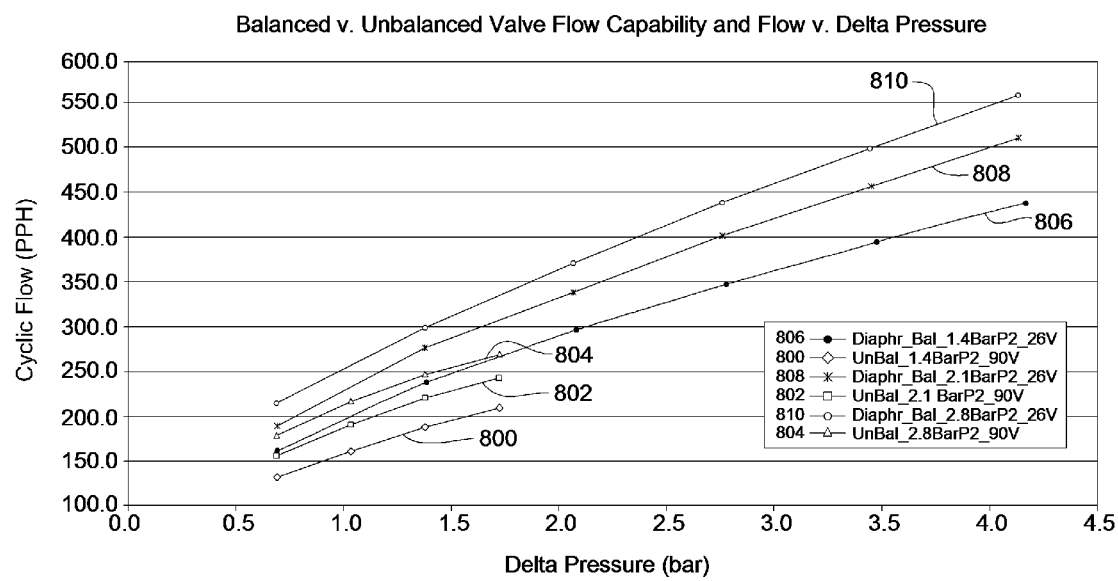
FIG. 8 is a graph illustrating plots of experimentally determined fluid flow rate capability of a balanced-pressure valve relative to the fluid flow rate capability of an unbalanced valve, both as a function of differential pressure.

FIG. 8 shows the relationship of the fluid flow rate capability of a balanced-pressure valve 108 to the fluid flow rate capability of an unbalanced valve, both as a function of differential pressure. Flow through a fixed valve opening area is dictated as a function of inlet pressure and differential pressure. As such, increased inlet pressure will result in increased flow rates through the valves. As noted previously, the valves may be limited in size the only thing that may, in some implementations, be able to be altered is inlet pressure to vary flow rate through the valve. However, with an unbalanced arrangement, increased pressure decreases the ability of the fluid admission valve 108 to be an electronically actuated valve as opening forces increase. However, FIG. 8 illustrates that flow capability can be increased by balancing the valve 108 by allowing increased differential pressure across the valve without preventing the valve 108 from being able to be opened.

Plots 800, 802, 804, represent the fluid flow rates of an unbalanced valve, and plots 806, 808, 810 represent the fluid flow rates of a pressure-balanced valve 108. As shown, the plots 800-804 for the unbalanced valve terminate at approximately 1.7 bar differential pressure. Because of the high fluid pressure, the unbalanced valve could no longer open beyond this differential pressure. On the other hand, the flow plots 806-810 for the pressure-balanced valve 108 substantially exceed the unbalanced plots. It is to be noted that no differential pressure limitations exist for the fluid admission valve 108 in the fully balanced state. As shown in FIG. 8, the flow rate of a pressure-balanced valve 108 increases when differential pressure is increased. Again, because greater differential pressures can be exposed to the pressure-balanced valve 108, greater flow rates can be attained even using a same open valve flow area. This can be highly beneficial when there is a need for higher flow rates but there cannot be an increase in valve size to provide the higher flow rates by larger open valve flow areas.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid admission system comprising:
a valve housing having a fluid inlet region and a fluid outlet region;
a fixed metering plate;
a movable metering plate movable relative to the fixed metering plate along a linear travel axis between a closed position wherein a seal surface of the movable metering plate abuts an abutment surface of the fixed metering plate to prevent fluid flow from the fluid inlet region to the fluid outlet region and an open position wherein the movable metering plate and the fixed metering plate are separated by a distance to allow fluid flow from the fluid inlet region to the fluid outlet region;
an armature coupled to the movable metering plate configured to move the movable metering plate relative to the fixed metering plate;
a balancing arrangement operably coupled to the movable metering plate for applying biasing to the movable metering plate;
a balancing chamber completely fluidly separated from the fluid inlet region by the balancing arrangement when the movable metering plate is in the closed position, the balancing arrangement having a first balancing area acted on by a first fluid pressure within the inlet region to operably bias the movable metering plate toward the open position and the balancing arrangement having a second balancing area acted on by a second fluid pressure within balancing chamber, the second fluid pressure being independent of the first fluid pressure in the closed position, to operably bias the movable metering plate toward the closed position;
wherein the movable metering plate has a first effective surface area that is normal to the travel axis and that is acted on by the first fluid pressure to bias the movable metering plate toward the closed position;
the movable metering plate has a second effective surface area that is normal to the travel axis and is exposed to the second fluid pressure to bias the movable metering plate toward the open position, the second effective surface area being formed by the portion of the seal surface that overlaps the flow opening of the fixed metering plate and is not abutted against the abutment surface;
the first balancing area is an effective area being normal to the travel axis;
the second balancing area is an effective area being normal to the travel axis; and
wherein the fluid inlet region is fluidly coupled to a source of a first fluid at a first fluid pressure (P1) and the fluid outlet region is fluidly coupled to a source of a second fluid at a second fluid pressure (P2) that is less than the first fluid pressure, and wherein the first effective surface area (A1'), the second effective surface area (A1"), the first balancing area (A2'), and the second balancing area (A2") are configured to satisfy the following equation:

$$P1*(A1')+P2*(A2'')=P1*(A2')+P2*(A1'').$$

2. A fluid admission system comprising:
a valve housing having a fluid inlet region and a fluid outlet region;
a fixed metering plate;
a movable metering plate movable relative to the fixed metering plate along a linear travel axis between a closed position wherein a seal surface of the movable metering plate abuts an abutment surface of the fixed metering plate to prevent fluid flow from the fluid inlet region to the fluid outlet region and an open position wherein the movable metering plate and the fixed metering plate are separated by a distance to allow fluid flow from the fluid inlet region to the fluid outlet region;
an armature coupled to the movable metering plate configured to move the movable metering plate relative to the fixed metering plate;
a balancing arrangement operably coupled to the movable metering plate for applying biasing to the movable metering plate;
a balancing chamber completely fluidly separated from the fluid inlet region by the balancing arrangement when the movable metering plate is in the closed position, the balancing arrangement having a first balancing area acted on by a first fluid pressure within the inlet region to operably bias the movable metering plate toward the open position and the balancing arrangement having a second balancing area acted on by a second fluid pressure within balancing chamber, the second fluid pressure being independent of the first fluid pressure in the closed position, to operably bias the movable metering plate toward the closed position;
wherein the movable metering plate has a first effective surface area that is normal to the travel axis and that is acted on by the first fluid pressure to bias the movable metering plate toward the closed position;
the movable metering plate has a second effective surface area that is normal to the travel axis and is exposed to the second fluid pressure to bias the movable metering plate toward the open position, the second effective surface area being formed by the portion of the seal surface that overlaps the flow opening of the fixed metering plate and is not abutted against the abutment surface;
the first balancing area is an effective area being normal to the travel axis;
the second balancing area is an effective area being normal to the travel axis; and
wherein the fluid inlet region is fluidly coupled to a source of a first fluid at a first fluid pressure (P1) and the fluid outlet region is fluidly coupled to a source of a second fluid at a second fluid pressure (P2) that is less than the first fluid pressure, and wherein the first effective surface area (A1'), the second effective surface area (A1"), the first balancing area (A2'), and the second balancing area (A2") are configured to satisfy the following equation:

$$P1*(A1')+P2*(A2'')=X*(P1*(A2')+P2*(A1'')),$$

wherein X is between about 0.8 and 1.2.
3. The fluid admission system of claim 2, wherein the fluid inlet region is fluidly coupled to a source of a first fluid at a first fluid pressure (P1) and the fluid outlet region is fluidly coupled to a source of a second fluid at a second fluid pressure (P2) that is less than the first fluid pressure, and wherein the first effective surface area (A1'), the second effective surface area (A1"), the first balancing area (A2'), and the second balancing area (A2") are configured to satisfy the following equation:

$$P1*(A1')+P2*(A2'')=X*(P1*(A2')+P2*(A1'')),$$

wherein X is between about 0.9 and 1.1.
4. A fluid admission system comprising:
a valve housing having a fluid inlet region and a fluid outlet region;
a fixed metering plate;
a movable metering plate movable relative to the fixed metering plate along a linear travel axis between a closed position wherein a seal surface of the movable metering plate abuts an abutment surface of the fixed metering plate to prevent fluid flow from the fluid inlet region to the fluid outlet region and an open position wherein the movable metering plate and the fixed metering plate are separated by a distance to allow fluid flow from the fluid inlet region to the fluid outlet region;
an armature coupled to the movable metering plate configured to move the movable metering plate relative to the fixed metering plate;
a balancing arrangement operably coupled to the movable metering plate for applying biasing to the movable metering plate;
a balancing chamber completely fluidly separated from the fluid inlet region by the balancing arrangement when the movable metering plate is in the closed position, the balancing arrangement having a first balancing area acted on by a first fluid pressure within the inlet region to operably bias the movable metering plate toward the open position and the balancing arrangement having a second balancing area acted on by a second fluid pressure within balancing chamber, the second fluid pressure being independent of the first fluid pressure in the closed position, to operably bias the movable metering plate toward the closed position;
wherein the movable metering plate has a first effective surface area that is normal to the travel axis and that is acted on by the first fluid pressure to bias the movable metering plate toward the closed position;
the movable metering plate has a second effective surface area that is normal to the travel axis and is exposed to the second fluid pressure to bias the movable metering plate toward the open position, the second effective surface area being formed by the portion of the seal surface that overlaps the flow opening of the fixed metering plate and is not abutted against the abutment surface;
the first balancing area is an effective area being normal to the travel axis;
the second balancing area is an effective area being normal to the travel axis; and
wherein the first balancing area and the first effective area are equal and the second balancing area and the second effective area are equal.
5. The fluid admission system of claim 4, wherein the fixed metering plate defines a flow opening through the abutment surface thereof through which fluid flow passes in the open position, the seal surface abuts the abutment surface of the fixed metering plate and over laps and seals off the flow opening in the closed position.
6. The fluid admission system of claim 4, wherein the balancing chamber fluidly communicates with the outlet region when the movable metering plate is in the closed position.

7. The fluid admission system of claim 6, further comprising a balancing passage passing through the armature, the balancing passage fluidly communicates the outlet region with the balancing chamber when the movable metering plate is in the closed position.

8. The fluid admission system of claim 4, wherein the balancing arrangement includes a balance seal coupled between the valve housing and the armature, the balancing arrangement is also formed, at least in part, by the armature such that at least a portion of the armature forms part of the first balancing area and a portion of the armature forms part of the second balancing area, the portion of the armature forming part of the second balancing area being sealed from the fluid inlet region by the balance seal.

9. The fluid admission system of claim 8, wherein the balance seal comprises an annular diaphragm through which the armature extends, the diaphragm being flexible allowing the armature to move along the travel axis.

10. The fluid admission system of claim 9, wherein the balance seal is coupled to the armature by a bead retainer, the bead retainer forming part of the first balancing area upon which the first pressure acts to bias the movable metering plate toward the open position.

11. The fluid admission system of claim 10, further comprising a biasing element biasing the movable metering plate toward the closed position.

12. The fluid admission system of claim 11, further comprising a first plurality of grooves located in the seal surface of the movable metering plate, and a second plurality of grooves located in the abutment surface of the fixed metering plate with which the sealing surface abuts, the second plurality of grooves combining to form the flow opening, wherein each of the first plurality of grooves of the movable metering plate is separated by a first land portion that overlaps the second plurality of grooves of the fixed metering plate when the seal surface of the movable metering plate abuts the abutment surface of the fixed metering plate in the closed position, the first land portions defining the seal surface, and wherein each of the second plurality of grooves of the fixed metering plate is separated by a second land portion that overlaps the first plurality of grooves of the movable metering plate when the seal surface of the movable metering plate abuts the abutment surface of the fixed metering plate in the closed position.

13. The fluid admission system of claim 12, wherein the first balancing area and the first effective area are equal and the second balancing area and the second effective area are equal, such that the only effective force maintaining the movable metering plate in the closed position is the force provided by the spring element.

14. The fluid admission system of claim 13, further comprising an actuator that causes the armature to move the movable metering plate from the closed position to the open position when energized;
    wherein the armature comprises a ferrous metal armature, and wherein the actuator comprises a solenoid configured to generate a magnetic field when energized to attract the ferrous metal armature to move the movable metering plate from the closed position to the open position; and
    further comprising:
    a driver operably coupled to the actuator, wherein the driver is configured to energize the solenoid to move the movable metering plate from the closed position to the open position; and
    a combustion cylinder of an engine, wherein the combustion cylinder is in fluid communication with the fluid outlet region, and wherein the driver regulates fluid flow from the fluid inlet region to the fluid outlet region for admission to the combustion cylinder.

15. The fluid admission system of claim 14, wherein the fluid inlet region is fluidly coupled to a source of a first fluid at the first fluid pressure and the fluid outlet region is fluidly coupled to a source of a second fluid at the second fluid pressure that is less than the first pressure.

\* \* \* \* \*